Jan. 10, 1950

A. J. WAHL 2,494,112

APPARATUS FOR MAKING MOLD CHARGES FROM PLASTIC CERAMIC MATERIALS

Filed Feb. 12, 1945

INVENTOR
*Albert J. Wahl.*
BY
*George J. Cieminger*
ATTORNEY

Jan. 10, 1950 A. J. WAHL 2,494,112
APPARATUS FOR MAKING MOLD CHARGES
FROM PLASTIC CERAMIC MATERIALS
Filed Feb. 12, 1945 7 Sheets-Sheet 3

INVENTOR
*Albert J. Wahl.*
BY
*George J. Arminger*
ATTORNEY

Patented Jan. 10, 1950

2,494,112

UNITED STATES PATENT OFFICE 2,494,112

APPARATUS FOR MAKING MOLD CHARGES FROM PLASTIC CERAMIC MATERIALS

Albert J. Wahl, Pleasant Hills, Pa., assignor to Miller Pottery Engineering Company, Swissvale, Pa., a corporation of Pennsylvania Application February 12, 1945, Serial No. 577,444

4 Claims. (Cl. 25—22)

1

This invention relates to apparatus for making mold charges from plastic ceramic material in the manufacture of pottery dinnerware and the like. It has to do particularly with the automatic production, in successive order, of clay charges or blanks containing a uniform or substantially uniform volume of material, to be deposited on the molds of automatic dinnerware fabricating machinery and formed into pieces of ware.

It is highly desirable in the manufacture of all grades of dinnerware, both vitreous and semivitreous, by automatic machine, that the charges of clay or blanks from which the ware is made be of substantially uniform size and volume for a given production. If the blanks are undersize or contain a smaller volume of clay than an allowable minimum, the molding surface may not be entirely covered, or not covered to the required depth, and the piece will be defective because of the deficiency and have to be scrapped. If the volume of clay contained in the blank exceeds a predetermined allowable maximum, an excessive amount of scrap or waste clay will be produced. This reduces the ware yield from a given tonnage of clay and increases production costs because of the additional expense for reprocessing the scrap.

In preparing plastic ceramic material for fabrication, it is customary to mix the ingredients with water and thereafter remove some of the liquid by filter pressing. The solids are recovered in the form of large slabs or cakes of plastic clay which are mascerated and homogenized by pugging, and from this pugged material the mold charges or blanks are made. Some attempts have been made heretofore to employ a pug mill as a means for feeding a solid column of clay to a periodically operated cutting off implement in the making of charges or blanks of clay automatically. Pug mills are usually equipped with an auger which forces the clay through a restricted outlet and it is the extrusion from this outlet which is segregated into charges. While this is a very simple and direct method of forming charges, it has not proved satisfactory or successful because the rate of extrusion is not uniform and the volume of clay contained in successive charges constantly varies beyond allowable limits.

Because of this inherent and undesirable characteristic of a pug mill, the trend has been in automatic production toward feeding systems wherein the pug mill extrusion is cut off in long rolls or pugs that are fed by separate mechanism

2 operating independently of the pug mill, to the cutting off implement. This has considerably increased the original cost for feeding equipment and has added to the expense of upkeep, maintenance and operation of automatic systems of production. To cite an example, one arrangement employs large capacity tubular magazines which are filled by the pug mill with clay and then manually detached and transported to a distant feed pipe and the contents pushed out through the pipe nozzle to a cutting wire by an hydraulically operated ram. The labor alone required to operate this system amounts to two or more men, and this does not take into account the labor required for maintenance and servicing.

It is among the objects of this invention to provide for making charges or blanks of clay in which the volume of material contained in successive charges or blanks is not greater or less than allowable limits wherein a pug mill or the like is employed as a means of feeding the clay to a periodically operated cutting off implement, thereby making this most simple and direct method of charging molds both practical and suitable for use in connection with present day automatic production machinery and eliminating the need for separate and costly clay feeding equipment.

Generally speaking, in accordance with this invention, the pug mill is arranged with the extrusion outlet facing downwardly toward the mold at the feeding station of an automatic ware fabricating machine. The cutting operation under the extrusion outlet is synchronized with the operations of the fabricating machine, the cutting wire operating in synchronism with the mold indexing means to sever a charge of clay from the pug mill extrusion to be deposited on a mold therebelow. The movement of the extrusion auger of the pug mill is automatically controlled by the machine so as to force the same or approximately the same volume of material through the extrusion outlet during and within each cycle of operation of the fabricating machine and the movement of the auger is arrested by other means during each machine cycle when the required volume of clay has been delivered and prior to the operation of the cutter.

Other objects and advantageous features will be noted in the following detail description and accompanying drawings wherein like reference characters designate corresponding parts and wherein.

Figures 1, 6:
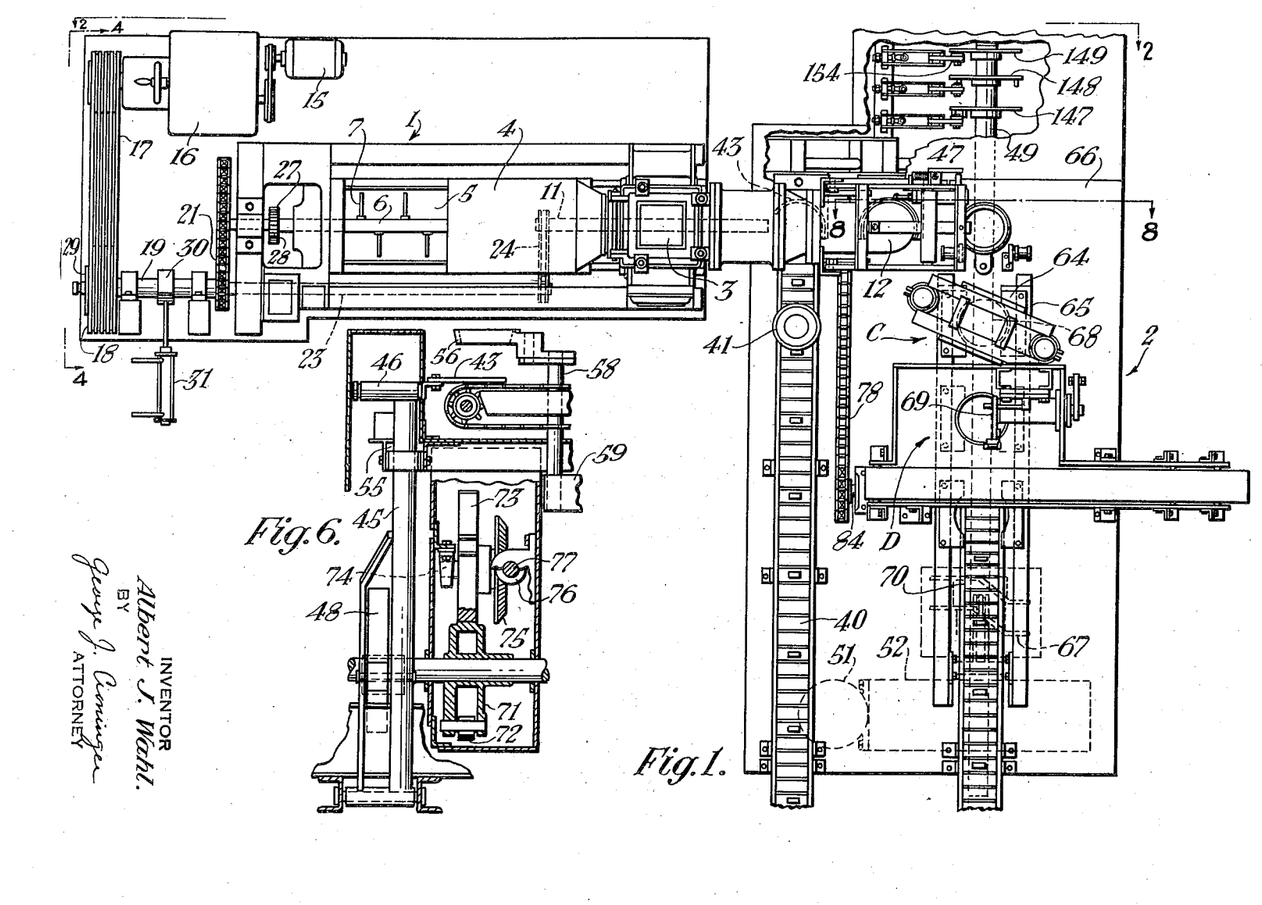
Figure 1 is a plan view of a ware fabricating machine and pug mill in associated feeding relation therewith.
Figure 6 is a detail in side elevation of the mold transfer ring apparatus and associated mechanism.
Figure 2:
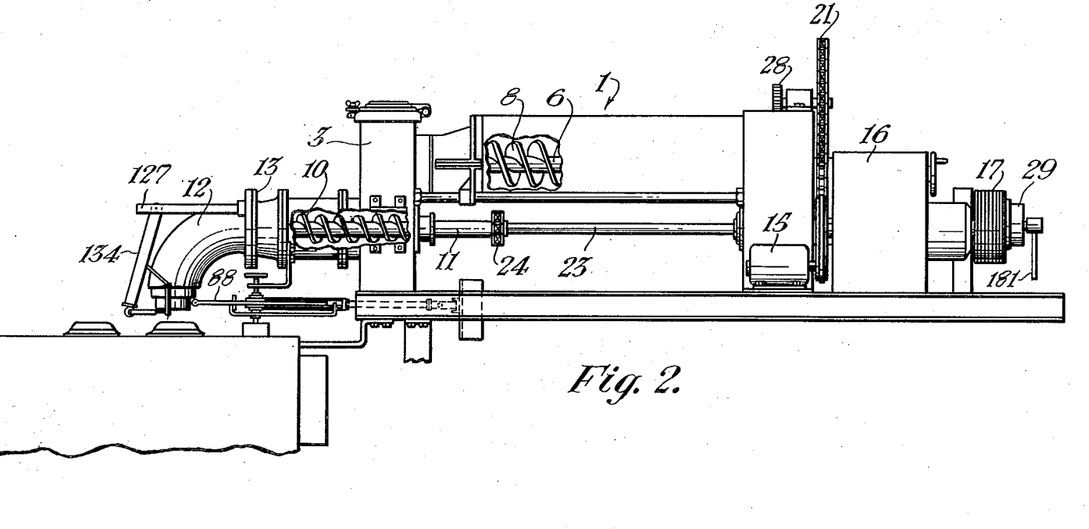
Figure 2 is a side elevation of the apparatus of Figure 1, with the lower half of the fabricating machine omitted, taken in the direction of arrows 2—2 of Figure 1.

With reference to Figures 1 and 2, I designates a pug mill and 2 a potteryware fabricating machine. While any suitable form of pug mill may be employed, I have shown by way of example a type known as a "de-airing" pug mill having a vacuum chamber 3 in which occluded air is removed from shredded clay to improve the workability of the clay and for other reasons.

Said pug mill has a hollow barrel 4 provided with a filling opening 5 through which filter cakes are passed to the mascerating chamber. Inside the barrel is an auger shaft 6 having mascerating blades 7 thereon to reduce the filter cakes to smaller size pieces and advance the material forwardly to the auger 8, Figure 2, on said shaft. The auger forces the clay through a shredder (not shown) into the vacuum chamber 3 where sub-atmospheric pressure is maintained for the purpose mentioned.

Figures 3, 4, 16:
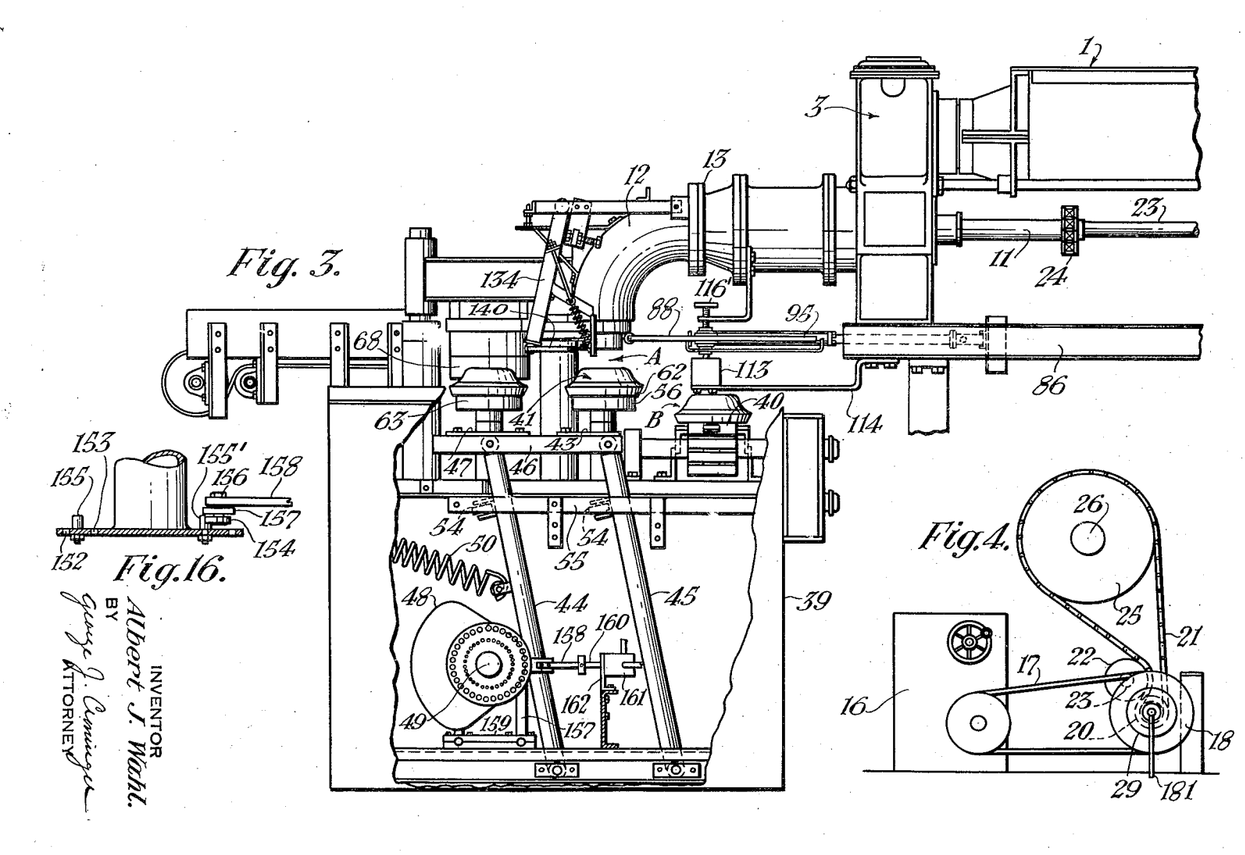
Figure 3 is an end elevation of the fabricating machine of Figure 1 and the front end of the pug mill on an enlarged scale and illustrating in side elevation some of the clay segregating apparatus and mechanism for controlling the operation thereof.
Figure 4 is an end elevation of the drive for the pug mill of Figure 1 taken in the direction of arrows 4—4 of Figure 1.
Figure 16 is a detail of one of the timer discs and a fragment of a valve operating member.

Clay is forced from the vacuum chamber by means of a lower auger 10 on shaft 11, through a tapered passage into a delivery pipe 12, here shown as an elbow bolted to the nozzle flange 13 of the pug mill, the lower or outlet end of the elbow being above and in vertical register with a mold support 56, Figure 3, of the fabricating machine at what I shall call the "feeding" or "mold charging" station A of the machine.

The upper auger 8 and the lower auger 10 may be driven in unison and started and stopped at the same time or they may be independently driven and separately controlled with regard to stopping and starting and adjustment in the speed of rotation thereof. The reasons for this will be hereinafter discussed.

Thus as shown in Figures 1 and 2 shafts 6 and 11 are rotated by a common drive having a motor 15, variable speed transmission 16, V-belt drive 17, clutch 18, Figure 4, clutch shaft 19, sprocket 20 thereon and drive chain 21 which rotates sprocket 22 on shaft 23 connected by a chain drive 24, Figure 2, to auger shaft 11, and which also rotates sprocket 25, Figure 4, on shaft 26 to drive upper auger shaft 6 by gears 27 and 28, Figure 1. Clutch 18 is provided with a pneumatic clutch control 29 and shaft 19 has a brake 30 thereon to be operated by an air cylinder 31.

Figure 5:
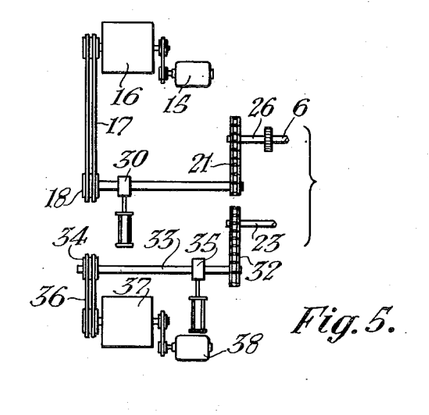
Figure 5 is a plan view of a modified form of drive for the pug mill augers.

For rotating each shaft independently of the other, the drive of Figure 5 may be employed. In this form of drive, auger shaft 6 is driven by the same drive apparatus shown in Figure 1, however, shaft 23 which drives auger shaft 11, is connected by sprocket chain 32 to clutch shaft 33 of an independent drive having a clutch 34, brake 35, V-belt drive 36, variable speed transmission 37 and motor 38. Thus each auger shaft may be controlled independently of the other.

The fabricating machine may, for example, comprise a frame 39 having a conveyor 40 for bringing empty molds 41 in single file to a transfer point B, Figures 1, 3, 6, 7 and 8, where they enter the open fork 43 of a reciprocable transfer apparatus to be carried thereby to the feeding station A. Said apparatus comprises a pair of spaced, parallel, vertical supports 44 and 45 pivoted at their lower extremities to the machine frame and connected across the top by a frame 46 to which transfer said fork 43 and another one 47 are attached. The supports 44 and 45 are caused to reciprocate back and forth by a cam 48 on main cam shaft 49 and return spring 50, the supports being guided in their back and forth movement by rollers 54 which roll in a horizontal guideway 55.

Fork 43, carries a mold from the conveyor 40 to a position directly over a hollow ring chuck 56, smaller in diameter than the fork 43 so as to pass therethrough, which is directly below the outlet end of pipe 12 and is supported, Figures 6 and 8, in an offset position on a post 58 socketed in the press crosshead 59 in rear of the chuck. The press crosshead 59 is raised and lowered on guides 60, Figure 8, by a cam 61 fixed on cam shaft 49 and spaced from cam 48. Thus when chuck 56 is elevated, the tang of the mold seats in the ring chuck 56 and it is lifted from the fork 43 where it is supported on the flare 62 and is carried upwardly to the outlet of pipe 12.

After the mold has been charged with clay in a manner to be hereinafter described, the chuck 56 is lowered by cam 61 into the other fork 47 of the transfer which has been moved to the right by cam 48 during the interval when the charge of clay was being cut off and deposited on the mold. When the transfer moves to the left again the charged mold is carried to a position directly over another ring chuck 63, mounted on a post 58 carried by crosshead 59.

Figure 8:
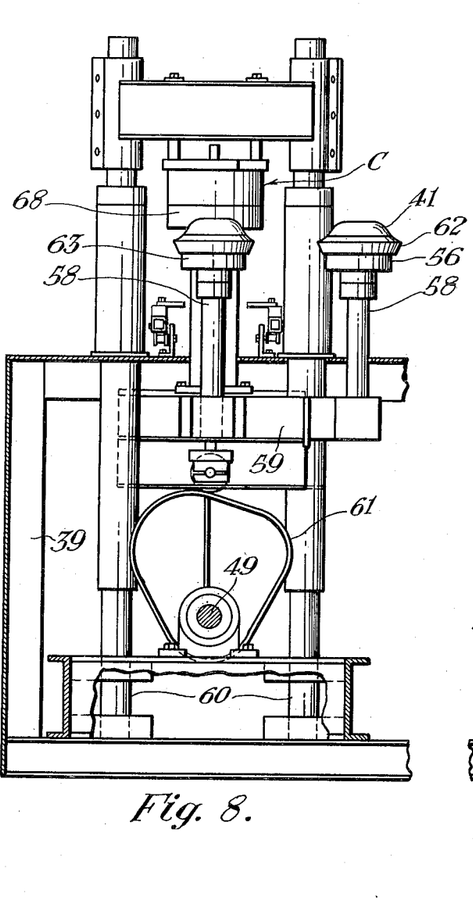
Figure 8 is a vertical section through the fabricating machine taken on line 8—8 of Figure 1.

Chuck 63 lifts the mold out of fork 47 and holds it in raised position until the fork 47 again moves to the right and the end seat 64 of a multiple seat transfer 65, Figures 1 and 8, slides on rollers 66 into position therebelow. Transfer 65 is moved back and forth by a drum cam 67, Figure 1, on main cam shaft 49. When end seat 64 is below chuck 63, the chuck is lowered by cam 61 to deposit the mold in said seat. This multiple seat transfer carries the charged molds to a pressing position C where the clay is spread over the ware forming surface of the mold by a die 68 and then to a jiggering station D where the mold is rotated relative to a profile tool 69 to finish the back or interior of the article as the case may be, and then the mold is carried to a conveyor 70 and deposited thereon to be transported to a dryer.

Figure 7:
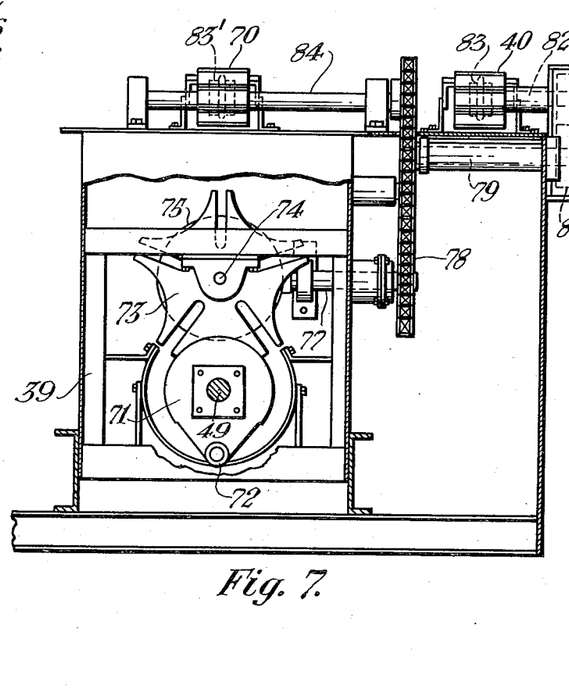
Figure 7 is a vertical section through the fabricating machine with some of the super structure omitted showing the Geneva drive for the mold conveying apparatus.

Conveyors 40 and 70 are intermittently moved by a Geneva drive, Figure 7. Said drive comprises a disc 71 fixed on cam shaft 49 having a roller 72 which successively enters the slots of the Geneva gear 73 thereabove fixed on shaft 74 journaled in the machine frame, Figure 6, to which a gear 75, Figure 6, is fixed that meshes with a pinion 76 on shaft 77; shaft 77, Figure 7, is connected by a sprocket chain 78 with a sprocket on shaft 79 that drives conveyor 40 by means of gears 80 and 81, the latter gear being fixed on shaft 82 having a sprocket 83 thereon in driving association with the underside of the conveyor 40. Chain 78 also drives conveyor 70, but in the opposite direction, by shaft 84 and sprocket 83', Figures 1 and 7.

The main camshaft 49 of the fabricating machine is driven by a motor 51, Figure 1, through reduction gearing enclosed in housing 52 including a clutch (not shown) to be manually actuated to start and stop the machine.

So much for the fabricating machine per se. It will suffice to say that the various moving parts of the apparatus just described are operated in synchronous fashion, so as to remove molds from conveyor 40 and index them from station to station until they are finally deposited on conveyor 70 with the formed ware thereon. Other forms of fabricating machine may, if desired, be substituted for the one described, for instance, an intermittently operated table type machine wherein the molds would be carried in a circular path through the fabricating zone.

The charge segregating apparatus, Figure 2, is disposed below the outlet end of discharge pipe 12 in position to sever charges of clay from the extrusion that issues therefrom and is supported by the frame 86 on which the pug mill is supported above the floor.

Figure 10:
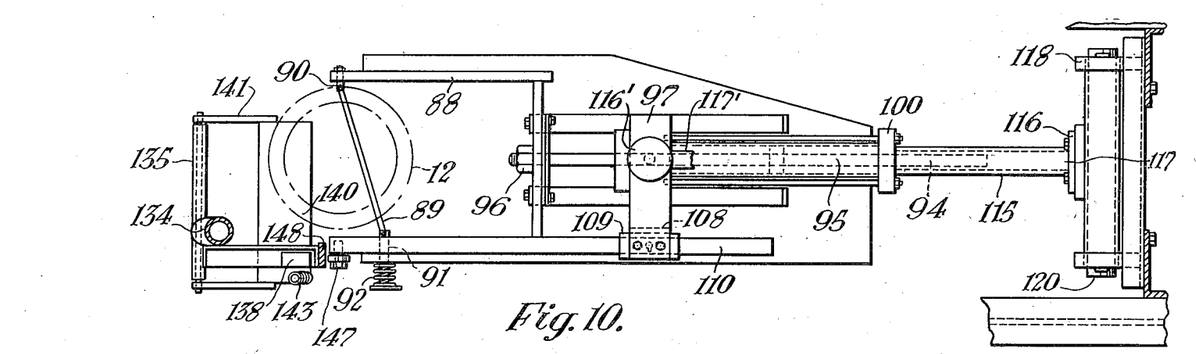
Figure 10 is a plan view of the cutting off apparatus.
Figure 11:
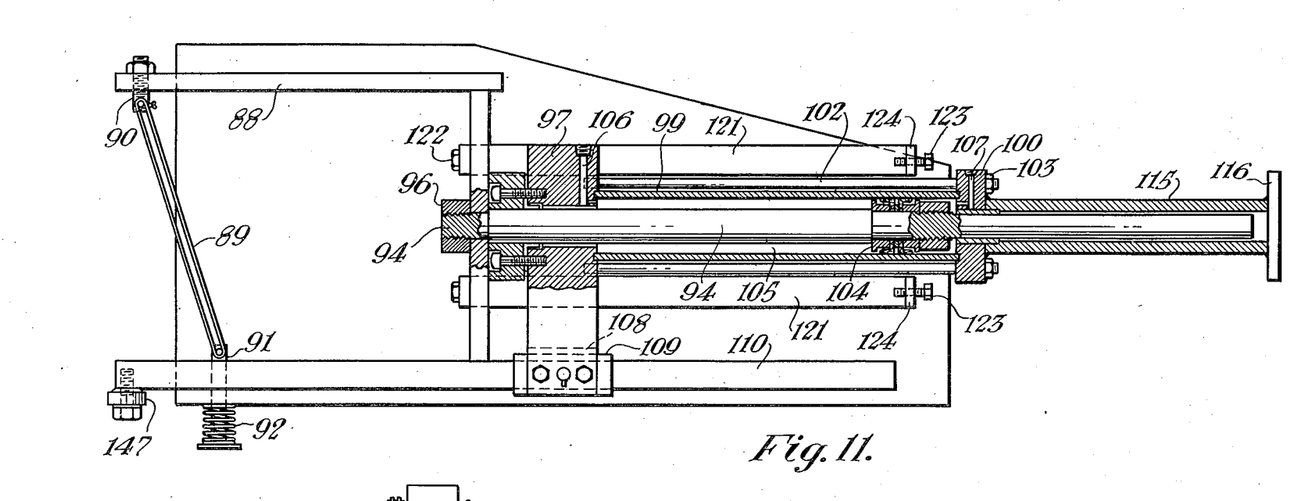
Figure 11 is a plan view of the cutter frame and air cylinder actuating means with the latter shown in section.

Said segregating apparatus comprises a cutter frame 88, Figures 10 and 11, open at one end and having a cutting wire 89 detachably suspended across the open end between posts 90 and 91 and angling rearwardly from side to side, the wire being tensioned by a spring 92 on post 91. The closed end of the frame has a center hole through which the threaded end of piston rod 94 of air cylinder 95 projects and is secured thereto by nut 96.

Air cylinder 95 comprises a front cylinder head 97 having a bushed hole therein for receiving the piston rod 94 and a groove around the hole in which a tubular sleeve 99 is seated. The rear cylinder head 100 also has a bushed hole therein for receiving the plunger and a groove around the hole to receive the opposite end of the tubular sleeve 99. The assembly thus described is held together by a plurality of tie rods 102 that are threaded into tapped holes in cap 97 and project through holes in cap 100 which is tightened against the sleeve 99 by nuts 103 thereon.

The piston rod 94 has a plunger 104 fixed thereon to be moved in one direction by air entering the piston chamber 105 through a bore 106 in the front cap to thereby retract the cutter frame after a segregating operation. The piston and cutter frame are moved in the opposite direction on the cutting stroke by air under pressure entering the opposite end of the piston chamber through a bore 107 in rear cap 100.

To prevent the cutter frame from rotating about the axis of the piston rod, it is guided in its forward and reverse movement. For this purpose, the front cylinder head 97 is formed with a lateral extension which is slotted out as at 108 and wear plates 109 fastened to the top and bottom of the slot. One of the side members of the cutter frame is extended rearwardly as at 110 and is received in the slot and, as the frame moves back and forth the guide extension 110 slides freely in the slot and prevents the frame from turning.

Figures 9, 12, 13:
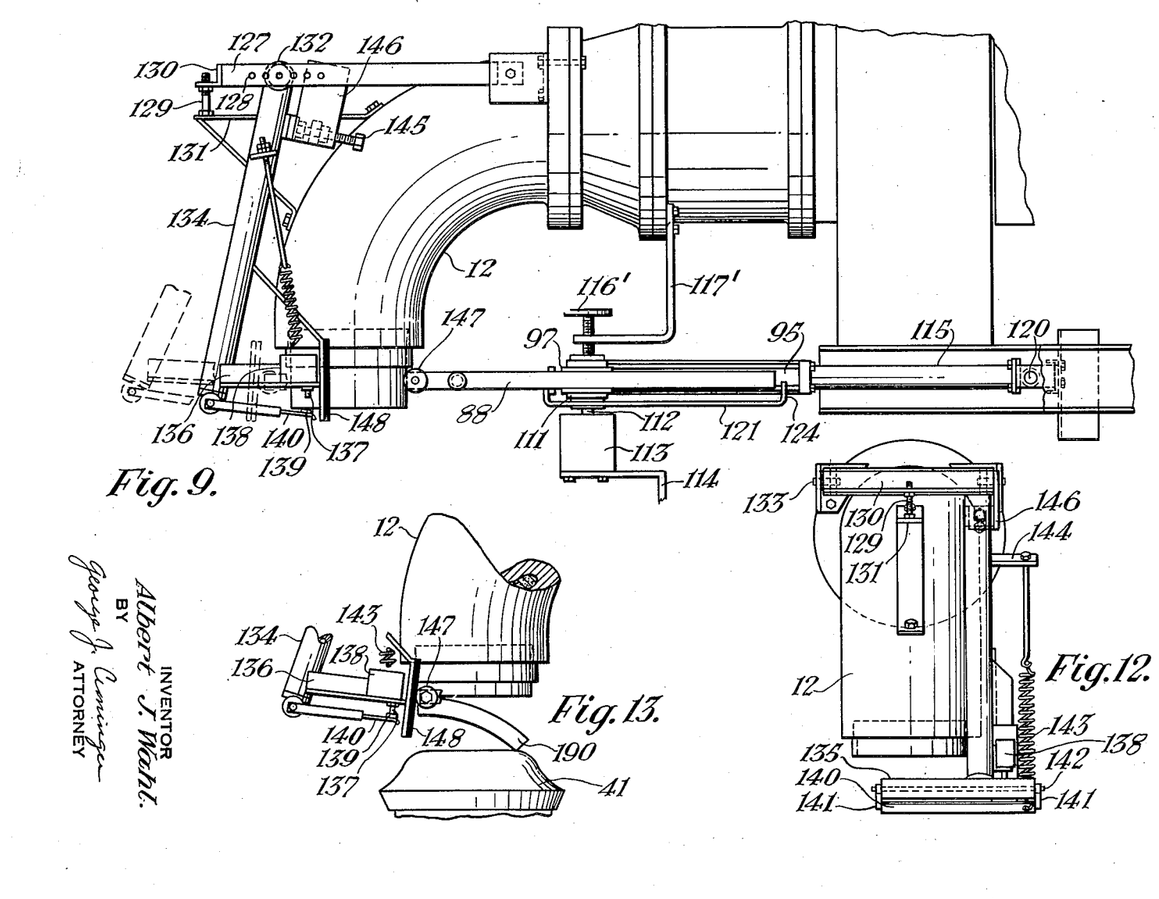
Figure 9 is enlarged detail in side elevation of the segregating apparatus and control mechanism therefor.
Figure 12 is an end elevation of the apparatus of Figure 9 viewed from in front of the pug mill nozzle.
Figure 13 is a detail illustrating how the segregating apparatus operates in severing slices of clay from the pug mill extrusion.

The under surface of the front cap 97 is faced off to provide a level, smooth surface which rests on a plate 111 of Figure 9, fixed to the end of a piston rod 112 forming part of an air cylinder assembly 113 supported therebelow in vertical position on a bracket 114 attached to the pug mill frame. The purpose of this air cylinder is to lower the cutter frame at the end of the cutting stroke so that the cutting wire may be pulled back without danger of interference with the stub of clay projecting from the outlet of pipe 12. The air cylinder assembly 95 is supported in such manner as to provide for this movement by welding to the rear cylinder head 100 a tubular extension 115, Figure 11, closed at the end by a plate 116 to which a long hollow bearing 117, Figure 10, is secured. This bearing is attached to a support 118, secured to the pug mill frame, by a horizontal connecting pin 120 fixed in place to thereby provide for a pivoted connection allowing the air cylinder and cutter frame to be angularly moved in a vertical direction about this point as an axis. The piston rod 94 extends rearwardly through cylinder head 100 into the tubular extension 115. Angular movement of the cutter frame is regulated by an adjusting screw 116', Figure 9, above the air cylinder 95 supported by a bracket 117' secured to the nozzle flange of the pug mill, Figure 9.

To regulate the extent of forward movement of the cutter frame, stop rods 121 one on either side of the air cylinder are attached to the rear of the cutter frame by bolts 122, Figure 11. When the frame is moved forward, the adjusting screws 123 in the up turned ends 124 of these rods engage the rear face of cylinder head 97 and prevent further forward movement of the cutter frame. The extent of forward travel of the frame may be adjusted by said screws. The mechanism for operating the cutter in timed relation with the other apparatus hereof will be discussed later on in this description.

It is contemplated herein that the extrusion from the pug mill be arrested either by stopping it entirely or by appreciably slowing it down whilst a charge is being segregated therefrom. I propose to arrest the extrusion from a de-airing pug mill by stopping or slowing down auger 10 which forces the clay through the outlet of pipe 12 with or without discontinuing the feeding of clay into the vacuum chamber 3. Since the invention contemplates the use of pug mills other than the type shown, for instance, a pug mill not equipped with a vacuum chamber, the auger shaft would, in such instance, correspond to the upper auger shaft 6.

For controlling the operation of the de-airing pug mill, the following apparatus is preferred: attached to the rear flange of pipe 12, Figure 9, so as to pivot up and down is a rectangular frame 127 having a series of corresponding holes 128 drilled in opposite side members thereof. The frame is supported at the free end by a stud 129 received in a bracket 130 fixed to the center of the forward cross piece. The head of this stud rests on a level support 131 bolted to the pipe 12 at the bend. By screwing the stud up or down, the angular position of the frame can be changed.

From said frame is suspended a control switch support comprising a tubular sleeve 132 pivoted on pins 133, Figure 12, inserted in holes 128, and depending from one end of this sleeve is a rod or tube 134 having a long bearing sleeve 135 fixed to the lower end thereof. Fixed to and extending outwardly at an angle from rod 134 near the lower end is a switch support 136 having a hole therein through which the plunger 137 of switch 138 projects. To operate this switch, a lug 139 is welded to the top surface of a control plate 140 which is pivotally supported by arms 141 attached thereto that are apertured and receive a pivot pin 142 inserted in bearing sleeve 135. Said plate is at least as long as one-half the diameter of the extrusion from pipe 12 and is normally held in a raised position by spring 143 fastened thereto and to a bracket 144 on rod 134, see Figure 10.

It is intended that plate 140 shall be located in such position that it will be below and in line with the extrusion issuing from the pug mill and to be depressed thereby against the tension of spring 143 to operate the switch 138 and actuate an electrical control operable to stop or slow down auger 10, and thus arrest the extrusion as will be explained in greater detail hereinafter.

Rod 134 may be angularly adjusted relative to its pivot by adjusting screw 145 mounted in a bracket 146 fixed to frame 127. Thus, the position of control plate 140 may be adjusted in or out with reference to the vertical axis of the extrusion issuing from the outlet of pipe 12 as well as vertically relative to the horizontal plane of the outlet. Since the distance the control plate is located below the outlet of pipe 12 determines the volume of material to be extruded in each machine cycle, these adjustments are, of course, instrumental in determining the volume of clay contained in the charge and for varying it when it becomes desirable to increase or decrease the amount of material to be fed the molds.

In order to move the control plate back from the extrusion and, thus, clear the space between the charge and the mold therebelow, cutter frame 95 has a roller 147 mounted on one of the frame members at the open side ahead of the cutting wire in position to engage a rubber surfaced bumper plate 148 fixed in vertical position at the end of switch support 136. Thus, as a slice of clay is cut off by the cutter wire, the control plate 140 is pushed from under the extrusion, and, when clear, is pulled up into normal position by the spring 143 thereby depressing plunger 137 of switch 136 to reset the circuit controlling the restarting of the pug mill, as will be more fully described hereinafter.

The reciprocation of the cutter wire 89, the raising and lowering of the cutter frame 88, the operation of clutch control 29 and brake 30 are all controlled by timing mechanism which is operated from the main camshaft 49 of the fabricating machine. Said mechanism comprises a plurality of timer discs some of which are shown in Figure 1 at 147, 148 and 149, and the remainder at 150 and 151 in Figure 15. They are fixed on the camshaft in spaced apart relation. Each disc has two concentric circles of holes 152 and 153 spaced apart not less than the diameter of a roller 154. Said roller, Figure 16, is to be pushed back and forth by a pin 155 inserted in one of the holes of the circle of holes 152 and a pin 155 inserted in one of the holes of the circle of holes 153. Said roller is supported by a pivot pin 156 connecting levers 157 and 158 together, lever 157 being arranged in a vertical position and pivoted on a support 159, Figure 3, at the lower end, and lever 158 being arranged in a horizontal position and connected to the plunger 160 of a valve 161 supported on a bracket 162 adjacent each timer disc. For convenience, the valve associated with disc 147 will be designated 163, Figure 15; that associated with disc 148 will be designated 164; that associated with disc 149, will be designated 165, that associated with disc 150, will be designated 166, and that associated with disc 151, will be designated as 167. Thus, in order named, valve 163 controls air cylinder 113 which raises and lowers the cutter; valve 164 controls reverse motion of the piston of air cylinder 95; valve 165 controls forward movement of the piston of air cylinder 95, valve 166 controls the clutch control 29 and valve 167 controls the air cylinder 31 of brake 30. In the case of lever 157 associated with valve 166, a lever 168 is connected thereto and to a solenoid 169 that is connected in circuit with switch 138. In the case of lever 157 associated with valve 167, a lever 170 is connected thereto and to a solenoid 171 that is connected in circuit with switch 138.

In the operation of the apparatus, it will be assumed that one complete revolution of the main cam shaft 49 represents one complete cycle of the fabricating machine. Furthermore, it will be assumed that both augers 8 and 10 will be stopped and started during each cycle of operations of the fabricating machine.

Referring to Figure 1, after the lead mold on conveyor 40 enters transfer fork 43, said fork is shifted to carry the mold 41 to station A, Figure 3. In this position the mold rests directly over and in register with a mold lifter or chuck 56. Mold lifter 56 is then raised by cam 61 and crosshead 59 to lift mold 41 out of fork 43 and carry the mold upwardly toward the dependent column of clay extruded through the outlet of pipe 12.

Figures 14, 15:
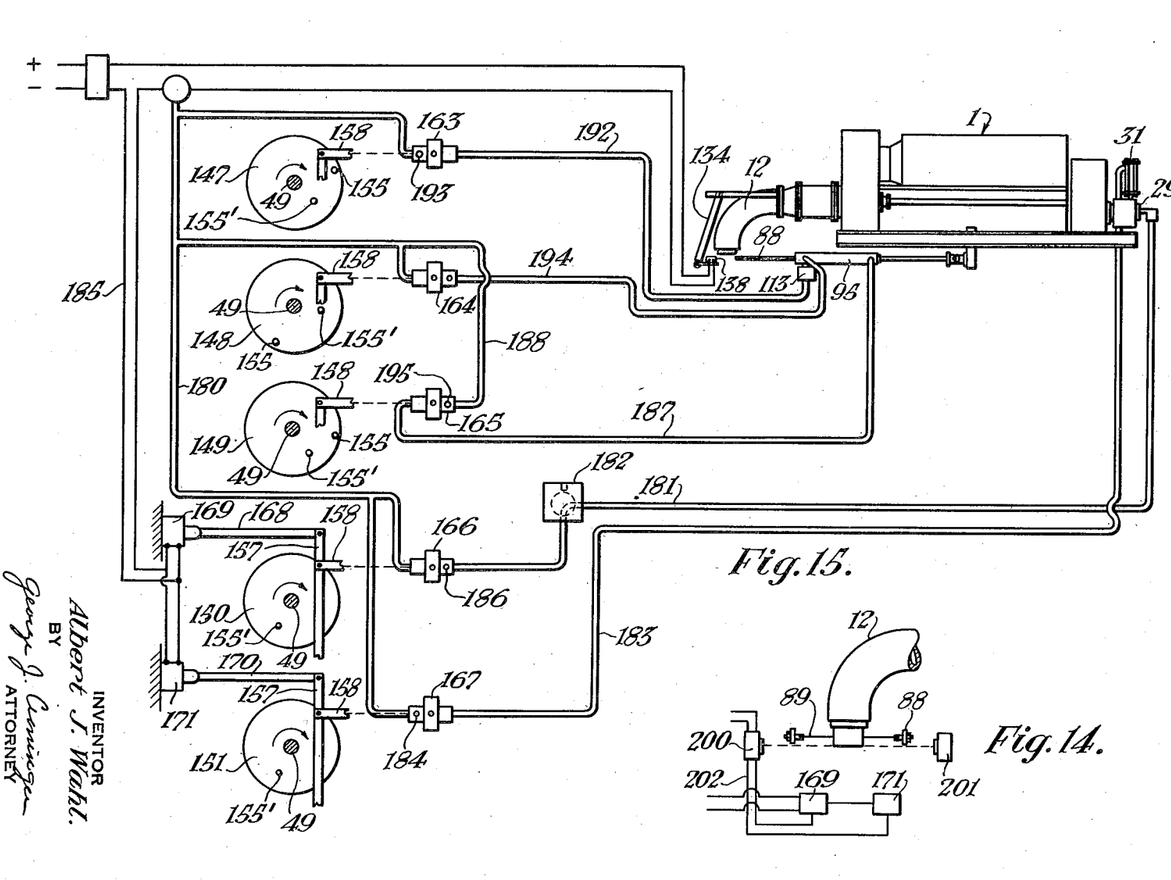
Figure 14 is a view showing in diagrammatic fashion how the operation of the cutter may be controlled by a photo-electric cell.
Figure 15 is a piping and wiring diagram combined illustrating the manner in which the entire apparatus is controlled.

Sometime between the time the mold is removed from conveyor 40 and lifted upwardly toward the pipe 12, pin 155 on timer disc 150, Figure 15, moves lever 158 to the right thereby actuating valve 166 and connecting the main air line 180 with line 181 leading to the pneumatic control 29 for clutch 17 on pug mill drive shaft 19. Said clutch control 29 is of conventional construction employing an inflatable member to engage the drive and driven elements thereof and the details of said control are therefor, not illustrated. When the clutch control is actuated, the pug mill commences to extrude clay through the outlet of pipe 12 and the operation of extruding such clay may commence as the mold is lifted upwardly toward the outlet, or prior thereto, depending upon the volume of clay to be extruded and the speed with which the pug mill augers are operated. 182 is a manual valve incorporated in air line 181 to control the pug mill by hand in case of emergency.

Simultaneously with the operation of valve 166 or just prior to the operation thereof, pin 155' on timer disc 151 moves lever 158 to the right to actuate valve 167 thereby disconnecting pipe 183 leading to the air cylinder 31 associated with brake 30 on shaft 19, Figure 1, from the main air line 180 and connecting pipe 183 to atmosphere through vent 184 in valve 167, Figure 15. This releases the brake on shaft 19 so that the shaft will be free to turn as soon as the clutch 17 is engaged.

During the operation of the pug mill it is preferred that the volume of clay fed into the vacuum chamber 3 is substantially equal to the volume of clay issuing from the outlet of pipe 12. The lower auger 10 is preferably operated in what is called a "starved condition" wherein the auger is only partly covered with shredded, deaired clay, and the vacuum chamber therefor, is consequently only partly filled with material. I have found that by operating the auger in this condition, the variations in the rate of extrusion are not as great as they would be otherwise.

After the clay has extruded through the outlet of pipe 12, a predetermined distance, the leading end of the column strikes control plate 140 and depresses the plate against the tension of the spring 143. This trips plunger 137 associated with switch 138 and energizes circuit 185 thereby energizing solenoids 169 and 171, Figure 15. When solenoid 169 is energized, lever 168 is pulled to the left thereby opening valve 166 and venting line 181 to atmosphere through vent 186, and simultaneously therewith valve 167 is closed to connect line 183 with the main air pressure line 180 to set brake 30. These operations arrest further extrusion of clay through the outlet of pipe 12.

The time required for each extrusion cycle may vary as between cycles due to the variation in the rate of extrusion. However, the maximum interval of time required to extrude a desired volume of clay may be determined in advance for any given size and volume of clay charge, and this maximum interval may be timed to start so that it will end prior to the time of operation of the cutting wire 89. This may be accomplished by providing an auger of the proper size and number of wings to produce the required extrusion, and by rotating it at the proper speed to deliver the required amount of material. Thus, in the cycle of operations and after or at substantially the time the extrusion is arrested, pin 155' on timer disc 149 pushes lever 158 to the right, Figure 15, thereby actuating valve 165 and connecting line 187 with line 188 leading to the main air pressure line 180. This causes the piston in air cylinder 95 to be moved to the left thereby cutting through the extrusion, Figure 13, to segregate a charge of clay 190 from the dependent column, the charge falling onto the molding surface of the mold which preferably has reached the highest point of elevation, although the charge may be cut off as the mold is being lifted up to charge receiving position, or as the mold is being lowered.

When roller 147 on the end of cutter frame 88 engages member 148, frame 134 is pushed to the left and as soon as the control plate 140 is disengaged from the extrusion, spring 143 pulls the control plate upwardly thereby causing the plunger on switch 137 to be actuated, which deenergizes circuit 185, Figure 15, thereby de-energizing solenoids 169 and 171.

After the cutter 88 has completed the cutting stroke, Figure 13, pin 155' on timer disc 147, moves lever 158 to the right thereby actuating valve 163 to disconnect line 192 from main air line 180 and connect line 192 to atmosphere through vent 193. The weight of frame 88 depresses the plunger in air cylinder 113, Figure 9, and permits the frame 88 to swing downwardly on its pivot thereby moving the cutting wire 89 away from the projecting end of the extrusion so as not to interfere therewith upon the return stroke of the cutter.

After the cutter has dropped down, pin 155' on timer disc 148 moves lever 158 to the right thereby actuating valve 164 to connect line 194 with main air line 180 thereby reversing the movement of the piston in air cylinder 95 to cause the retraction of the cutter. Just prior to the actuation of valve 164, valve 165 is actuated to connect air line 187 with atmosphere through vent 195. Upon retraction of the cutter, pin 155 on timer disc 147 moves lever 158 to the left thereby actuating valve 163 and connecting line 192 with the main air line 180. This causes the air cylinder 113 to again raise the cutter frame 88 to cutting level.

The cycle of operation just described, with regard to the extrusion of clay and the cutting off of the material and the return of the cutter to initial position, takes place within one complete cycle of operations of the fabricating machine and in this connection, after the mold 62 is charged with clay, the mold is lowered and deposited on the fork 47 of the transfer frame to be carried to the next station in a manner and for the purpose hereinbefore described.

Thus during each machine cycle the pug mill is started and stopped and the cutting wire is actuated to segregate a charge of clay. It has been stated herein that the extrusion auger of the pug mill could be appreciably slowed down rather than completely stopped during the segregating operation. This could be accomplished with the apparatus disclosed by merely slowing down the auger shaft by means of the brake 30 and by partial release of the clutch 17. Moreover, the extrusion auger shaft 6 may be controlled insofar as stopping or starting or slowing down is concerned whereas, the upper auger shaft 6 may, if desired, be permitted to run continuously. The drive shown in Figure 5 could be employed to accomplish this purpose in a perfectly obvious matter. Also, if desired, the upper shaft 6 and the lower shaft 10 may be operated and controlled independently of one another where it is desired to vary the rate of feed of shredded clay into the vacuum chamber.

Figure 14 illustrates how the operation of the pug mill may be controlled by means of a photoelectric cell. In this connection, photo-electric cell elements 200 and 201 are arranged so as to project a light beam across the path of travel of the extrusion at a given level. When the extrusion interrupts the beams, a circuit 202 is energized to cause the energization of solenoids 169 and 171 for purposes herein before specified.

I claim:

1. The combination with a pottery fabricating machine having means for moving a series of clay-shaping molds to and from clay-feeding and clay-forming stations at uniform intervals, of a pug mill having a discharge outlet, a laterally closed conduit extending from said discharge outlet to said feeding station and provided adjacent to the latter with a delivery orifice, a driven rotatable impeller in said pug mill for moving clay therefrom and through said conduit and extruding it in column form from said orifice, a movable cutter for removing from said column of clay a slice thereof in an amount sufficient to form a piece of potteryware without excessive waste, and means for stopping the rotation of said impeller and as a consequence thereof the extrusion of clay from said orifice, said means including as an element thereof an actuator disposed beyond the clay-cutting path of movement of said cutter and in the path of movement of the extruded clay and being responsive to the movement of the outer end of such clay, whereby the thickness of each slice of clay is determined by the spacing of said actuator from the clay-cutting path of movement of said cutter.

2. The combination with a pottery fabricating machine having means for moving a series of clay-shaping molds to and from clay-feeding and clay-forming stations at uniform intervals, of a pug mill having a discharge outlet, a laterally closed conduit extending from said discharge outlet to said feeding station and provided adjacent to the latter with a delivery orifice, a driven rotatable impeller in said pug mill for moving clay therefrom and through said conduit and extruding it in column form from said orifice, a movable cutter for removing from said column of clay a slice thereof in an amount sufficient to form a piece of potteryware without excessive waste, and means for stopping the rotation of said impeller and as a consequence thereof the extrusion of clay from said orifice, said means including as an element thereof an electric actuator having a switch-controlling member disposed beyond the clay-cutting path of movement of said cutter and in the path of movement of the extruded clay and movable by the movement of the outer end of such clay, whereby the thickness of each slice of clay is determined by the spacing of said switch-controlling member from the clay-cutting path of movement of said cutter.

3. The combination with a pottery fabricating machine having means for moving a series of clay-shaping molds to and from clay-feeding and clay-forming stations at uniform intervals, of a pug mill having a discharge outlet, a laterally closed conduit extending from said discharge outlet to said feeding station and provided adjacent to the latter with a horizontally-disposed orifice for delivering clay downwardly, a driven rotatable impeller in said pug mill for moving clay therefrom and through said conduit and extruding it downwardly in pendant column form from said orifice, a horizontally movable cutter for removing from said column of clay a slice thereof in an amount sufficient to form a piece of potteryware without excessive waste, and means for stopping the rotation of said impeller and as a consequence thereof the extrusion of clay from said orifice, said means including as an element thereof an actuator disposed below the clay-cutting path of movement of said cutter and in the path of movement of the extruded clay and being responsive to the downward movement of the outer end of such clay, whereby the thickness of each slice of clay is determined by the spacing of said actuator from the clay-cutting path of movement of said cutter.

4. The combination with a pottery fabricating machine having means for moving a series of clay-shaping molds to and from clay-feeding and clay-forming stations at uniform intervals, of a pug mill having a discharge outlet, a laterally closed conduit extending from said discharge outlet to said feeding station and provided adjacent to the latter with a horizontally-disposed orifice for delivering clay downwardly, a driven rotatable impeller in said pug mill for moving clay therefrom and through said conduit and extruding it downwardly in pendant column form from said orifice, a horizontally movable cutter for removing from said column of clay a slice thereof in an amount sufficient to form a piece of potteryware without excessive waste and means for stopping the rotation of said impeller and as a consequence thereof the extrusion of clay from said orifice, said means including as an element thereof an electric actuator having a switch-controlling member disposed below the clay-cutting path of movement of said cutter and in the path of movement of the extruded clay and movable by the downward movement of the outer end of such clay, whereby the thickness of each slice of clay is determined by the spacing of said switch-controlling member from the clay-cutting path of movement of said cutter.

ALBERT J. WAHL.

REFERENCES CITED

The following references are of record in the file of this patent:

UNITED STATES PATENTS

| Number | Name | Date |
|---|---|---|
| Re. 20,401 | Miller | June 8, 1937 |
| 1,800,324 | Shipley | Apr. 14, 1931 |
| 1,811,412 | Whitacre | June 23, 1931 |
| 1,842,622 | Miller | Jan. 26, 1932 |
| 1,931,371 | Bonnat | Oct. 17, 1933 |
| 1,944,464 | Richardson | Jan. 23, 1934 |
| 1,989,038 | Brown | Jan. 22, 1935 |
| 2,015,855 | Kerr | Oct. 1, 1935 |
| 2,051,781 | Brown | Aug. 18, 1936 |
| 2,054,476 | Derry et al. | Sept. 15, 1936 |
| 2,078,565 | Durst et al. | Apr. 27, 1937 |
| 2,109,028 | Miller | Feb. 22, 1938 |
| 2,204,513 | Sandburg et al. | June 11, 1940 |
| 2,204,532 | Erbguth et al. | June 11, 1940 |
| 2,278,513 | Emerson | Apr. 7, 1942 |
| 2,301,906 | Miller | Nov. 10, 1942 |
| 2,310,859 | Miller | Feb. 9, 1943 |
| 2,348,197 | Ernst et al. | May 9, 1944 |
| 2,356,496 | Avenhaus | Aug. 22, 1944 |
| 2,389,163 | Miller | Nov. 20, 1945 |

FOREIGN PATENTS

| Number | Country | Date |
|---|---|---|
| 412,248 | Great Britain | June 25, 1934 |
| 460,785 | Great Britain | Feb. 4, 1937 |